United States Patent [19]
Jacobi

[11] 3,800,461
[45] Apr. 2, 1974

[54] FISHING FLOAT DEVICE
[75] Inventor: Jacob Jacobi, Noorden, Netherlands
[73] Assignee: Syl-Mark Enterprises, Northridge, Calif.
[22] Filed: Dec. 16, 1971
[21] Appl. No.: 208,827

[30] Foreign Application Priority Data
Dec. 16, 1970 Netherlands.................... 7018350

[52] U.S. Cl............................. 43/44.88, 43/44.92
[51] Int. Cl........................................... A01k 93/00
[58] Field of Search............ 43/44.88, 44.92, 44.95, 43/44.87

[56] References Cited
UNITED STATES PATENTS

| 2,481,346 | 9/1949 | Rigby | 43/44.87 |
| 2,842,886 | 7/1958 | Williams | 43/44.87 |
| 1,504,065 | 8/1924 | Lower | 43/44.95 |
| 2,153,869 | 4/1939 | Jones | 43/44.88 |
| 3,443,336 | 5/1969 | Reese | 43/44.88 |

FOREIGN PATENTS OR APPLICATIONS

| 101,095 | 4/1962 | Netherlands | 43/44.87 |
| 162,146 | 1/1949 | Austria | 43/44.92 |

Primary Examiner—Louis G. Mancene
Assistant Examiner—Daniel J. Leach
Attorney, Agent, or Firm—Lyon & Lyon

[57] ABSTRACT

A self-adjusting float device slidably attached to a fishing line to maintain the hook end of the line at a predetermined position with respect to the bed of a body of water. The float comprises a guide member and a body member interconnected for relative movement with the line extending between the members. The said guide and body members are brought together by clamping means to fix the line therebetween when tension in the line is reduced and are separated to release the line when tension in the line is increased as a result of a tractive force applied to the line.

10 Claims, 2 Drawing Figures

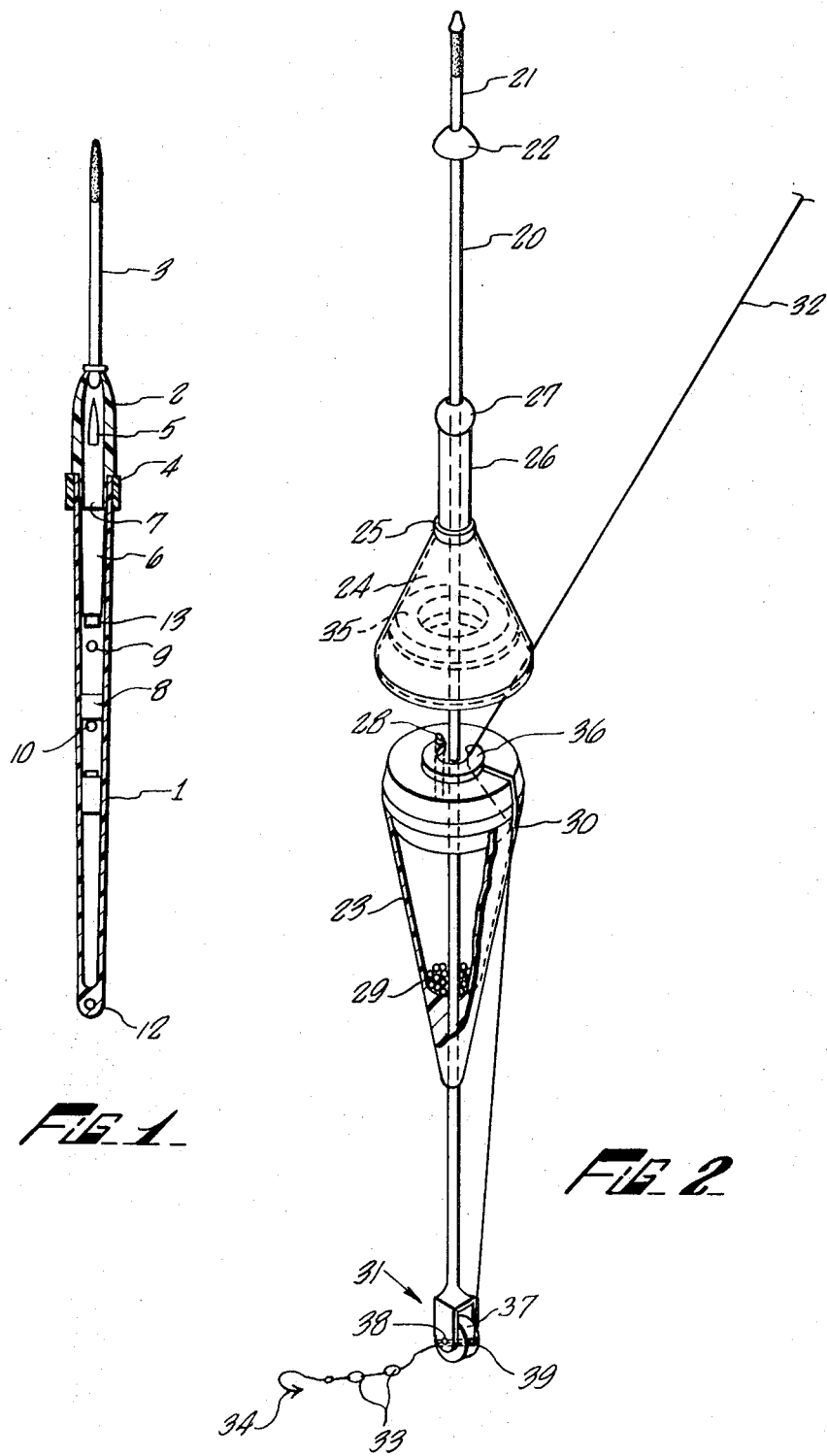

FISHING FLOAT DEVICE

This invention relates to a float device for fishing and more particularly relates to a float device which automatically adjusts the position of the hook in the water.

When making preparations for angling a fisherman attaches a conventional float at a predetermined distance from the hook to thereby place the hook at a predetermined position in the water with respect to the water bed or bottom. Typically, this distance is determined by means of a plummet which is either attached to the end of the fishing line or to the hook. The plummet is allowed to sink until it hits the bottom and the line goes slack, thereby indicating the distance from the bottom to the surface of the water at that location. This measuring or "sounding" usually must be carried out several times in order to preclude a mistake because of a locally raised or lowered spot of the bed.

After the approximate distance is determined, the plummet is removed and the float or a stopper for the float is fixed at the proper place on the fishing line. It is necessary to repeat this sounding procedure every time a new location is selected for fishing.

Self-adjusting float devices adapted to avoid the need for sounding have in the past proved to be less than satisfactory. A common disadvantage associated with such float devices relates to the problem of properly securing the fishing line to the float once the hook is in the desired position with respect to the bottom. Another problem associated with such devices involves the slippage of the line when the float is on the surface of the water because the components of the device holding the line are moved apart by the action of the water. This is particularly the case where the water is rough or choppy.

Therefore, it is a primary object of the present invention to provide a fishing float device which renders sounding unnecessary by automatically adjusting the position of the hook in the water with respect to the water bed.

It is a further object of this invention to provide such a fishing float device which adequately grips the fishing line once the desired position of the hook has been located and which releases the line when desired to avoid interference with the fishing or subsequent adjustment of the hook location in the water.

It is still another object of this invention to provide a fishing float device which when floating on the surface of the water is relatively unaffected by the motion of the water with regard to the desired gripping of the fishing line.

In accordance with these and other objects, the present invention contemplates a float device which is capable of releasing or holding the fishing line, whichever is desired, depending on whether a tractive force or pull is exerted on the fishing line. The float device includes a buoyant body and means for connecting the float device with a fishing line. A movable member movable with respect to the body member serves to secure the fishing line in a fixed position after the hook has reached a desired position in the water. The movable member is also movable to release the fishing line with respect to the device to permit movement of the line therethrough.

Still another object of this invention is to provide a float device for fishing which can be adjusted to float at various positions with respect to the water surface and which is suitable for use with various sizes of fishing lines.

Other and further objects and advantages of this invention will be made readily apparent from the following detailed description and the accompanying drawings, wherein:

FIG. 1 is a cross-sectional side view of a float device embodying the features of the present invention.

FIG. 2 is a perspective view, partly broken away and in section, illustrating a modified form of the invention.

Referring now to the drawings and specifically to FIG. 1, it is noted that the float device consists of a hollow body 1 closed at the upper end by a cap 2 which has extending therefrom a so-called "antenna" 3. A resilient annular ring 4 fits concentrically about the body 1 and cap 2 at the juncture thereof to provide a seal therebetween. The cap 2 is provided with a side opening 5 for communication of water therethrough. The body 1, cap 2 and antenna 3 are constructed of materials which form a generally buoyant structure.

A second body member 6 confined within the interior of the hollow body 1 is movable within the hollow body and guided by the interior sidewalls thereof. The body member 6 has a floating capacity or is buoyant with respect to the water and moves between an upper stop 7 in the interior of the hollow body and a lower stop 8 in the hollow body. Preferably, the upper stop 7 is formed by the end rim of the cap 2. Positioned between the stops 7 and 8 and extending through the side wall of the hollow body are a pair of openings or holes 9 positioned 180° apart and therefore only one opening is seen in FIG. 1. The hole 9 not shown is however located closer to the stop 8. Under the lower stop 8 is another side opening 10 for communication of water into the interior of the hollow body. The lower solid end of the body 1 is provided with a transverse bore 12 extending thereacross. If desired the lower end of the hollow body 1 may be provided with lead balls or other weights to weight the float device.

The fishing line is attached to the float by leading it through the upper hole 9 and then across the interior of the hollow body 1 out the lower hole 9 and then through the bore 12 at the end of the body 1. When the line is cast the float which is frictionally secured to the line, is pulled underwater due to the weight of the fishing hook (not shown) at the end of the line and the sinker (not shown) connected with the fishing line near the hook. Initially, the body member 6 which is guided by the interior side walls of the body 1 in its movement between the stops 7 and 8 is forced against the upper stop 7. However, aside from the frictional forces, the float device is free to move along the fishing line toward the water surface and does so move because of its buoyant nature. At the same time the hook continues sinking toward the bottom due to the tractive force of the sinker.

When the float eventually reaches the water surface, the water above the stop 8 runs out from the hollow body 1 through the opening 10. This causes the body member 6 to drop toward the stop 8 against the fishing line extending across the interior of the body 1 between the body member 6 and the stop 8. Once the hook and the sinker have reached the bottom the tractive force or pull on the line between the hook and the float will have become sufficiently diminished to permit the body member 6 to clamp down on the line and hold it against the stop 8. If it is desirable to lift the hook upwardly from the bottom or bed, the fisherman pulls on the line which lifts the body member 6 away from the stop 8 and permits fishing line to pass. When the fisherman releases the fishing line, the body member 6 moves toward the stop 8 and thereby clamps the fishing line with respect to the float device. Even though the hook and sinker do not lie on the bottom in this instance and thus exert a tractive force on the line this force will generally be insufficient to dislodge the body member 6 from its clamping position since there is no inertia coupled with the hook and sinker as there was during the initial cast. However, in certain instances it may be desirable to provide a greater clamping force. When the greater force is desired, as for example when a heavier fishing line is employed, the lower end of the body member 6 is provided with a magnet 13 such as that shown in FIG. 1 and the stop 8 is similarly equipped with a magnet or otherwise comprises means for attracting the magnet 13. The position of the float with respect to the water surface can be adjusted by adding or withdrawing weight from the lower part of the hollow body. However, this adjustment is limited by the position of the opening 10 which should in all instances remain above the surface of the water.

The float of FIG. 2 includes an oblong or elongated cylindrical guide member 20, the upper end of which constitutes the so-called "antenna" 21. Spaced apart and positioned concentrically about the guide member 20 are a pair of stops 22 and 23 with a movable body member 24 located therebetween and also concentrically mounted on the guide member 20. The underside of the body member 24 is open and the upper end of the body member is provided with an opening 25 adapted to receive therein a tube 26. The upper end of the tube 27 is adapted to function with the lower part of the stop 22 in such a way that air trapped in the movable body member cannot escape when the float is plunged into water. The lower stop also comprises a hollow body member which can contain lead balls 29 or other means for weighting the float device. This lower body member or stop 23 has a floating capacity or is buoyant. The body member 23 is also provided with a slot 30 and together with the connecting means, generally designated 31, at the lower end of the guide member 20, serves to connect the fishing line with the float device.

The float device is attached to the fishing line 32 by stringing the fishing line through the connecting means 31 and placing it in the slot 30. The upper surface of the body member or stop 23 is provided with a pivot pin 28 with a hook element 36 pivoted thereon which prevents the fishing line from moving transversely out from the slot 30 without restricting relative movement between the fishing line 32 and the float device. When cast, the float, which is frictionally secured to the line, sinks under the influence of the weight of a sinker 33 at the end of the fishing line. The movable body 24 is forced toward the stop 22 because of the air trapped within and the tube end 27 cooperates with the stop 22 to prevent the air from exiting.

Due to the weight of the hook and sinker and the buoyant nature of the float, the line and the float move relative to each other after the cast, with the hook moving downwardly to the bottom and the float moving upwardly toward the water surface. Friction between the line 32 and the float device and the tractive force of the sinkers acting thereon maintain the line taut between the float and the hook. Once the float reaches the surface and the body 24 has come sufficiently above the water surface that its floating capacity is in equilibrium with its weight, the stop 22 is lifted off the end of the tube 27 because of the floating capacity of the stop or body member 23 which forces the guide 20 upwardly. Once the tube end 27 and stop 22 separate, the air from the hollow movable body member 24 escapes and the body member then sinks toward the stop 23. This causes the fishing line to be pinched between the movable body member 24 and the stop 23. If it is desired to move the hook 34 off of the bottom, the fishing line is pulled upwardly. This pull or tractive force causes the body member 24 to move away from the stop 23 whereupon the fishing line can slide through the slot 30. When the tractive force or upward pull is ceased, the body member 24 falls back toward the stop and thereby clamps the fishing line against the stop 23.

When a greater clamping force on the fishing line is desired, a ring magnet 35 can be placed within the body member 24 and hook element 36 secured on the upper surface of the stop 23 is also magnetic. Preferably, the magnetic hook element 36 on the stop 23 is movable about the pin 28 and in the form of the hook whereby the magnet can also function to close the slot 30 to such an extend that the fishing line 32 cannot be pulled transversely from the slot.

The opening and closing of the valve formed by the stop 22 and tube end 27 can be adjusted due to the axial adjustment of the tube with respect to the body member 24. Thus, the amount of air which leaves the body member 24 after the valve formed by the end of the tube 27 and the stop 22 is opened can be correspondingly adjusted together with the floating capacity of the body member 24. This adjustment determines the position of the float with respect to the water surface and the sensitiveness of the float.

It is important that even during the relative movement of the fishing line with respect to the float device that there is a frictional force acting therebetween. This causes the float device to be pulled under the water surface when cast due to the weight of the sinker and will keep the fishing line taut between the hook and the float device during the upward travel of the float to the surface of the water. In the embodiment of FIG. 1, friction between the line and the float is achieved by restricting the size of the hole 12 and orienting the longitudinal axis of the hole at a particular position with respect to the longitudinal axis of the float. For instance, in the embodiment shown in FIG. 1 the longitudinal axis of the hole 12 forms an angle of 90° with respect to the longitudinal axis of the float device.

The embodiment of the invention in FIG. 2 illustrates a connecting element 31 which is generally preferable when it is desirable to vary the diameter size of the fishing line. The connecting means 31 is adapted to regulate the extent of friction exerted on the fishing line. The connecting means 31 includes a cylindrical disc 37 which is attached by means of a spindle 38 in a U-shaped recess at the lower end of the guide 20. The disc 37 is rotatable about the spindle 38 and has a bore 39 therethrough perpendicular to the spindle 38. When the float is attached to the fishing line, the latter is passed through the bore 39. By turning the disc 37 and thus changing the orientation of the bore with respect to the longitudinal axis of the float, the resistance due to friction between the float and the fishing line can be accurately adjusted to any desired degree.

Preferably, at least one of the two stops 22 and 23 is slidably mounted on the guide member 20 for adjustment thereon. Thus, the time which passes between the release of the air from body member 24 and the moment which the fishing line is clamped between the body 24 and the stop 23 can be varied.

It will be evident that there are other possible constructions available to obtain a float which meets the principles and the requirements of the present invention. Instead of clamping elements with magnets it is for instance also possible to employ elements with a mechanical activity or combinations of the two. It will also be clear that the float described by means of FIG. 2 may also be constructed without a non-adjustable floating capacity. In this case body 24 has a fixed floating capacity of its own. A different type of float is thus obtained from what is represented by FIG. 1.

In any case the invention procures a float which meets all requirements made. The float can be adjusted for "heavy," "light" and "very light" and for "bottom" or "half-water" fishing and with the float having the "antenna" above, just on or just below the water surface. This was hitherto not possible with a single float.

Having fully described my invention, it is to be understood that I do not wish to be limited to the details herein set forth, but my invention is of the full scope of the appended claims.

I claim:

1. A buoyant float device for attachment to a fishing line having a hook thereon positioned with respect to the weighted free end thereof, comprising:
   a guide member and a body member interconnected for relative movement therebetween;
   means on the float for slidably attaching the float to the fishing line, said attaching means being positioned on the float so that the line extends between said guide member and said body member and when taut extends in a direction to separate said guide member and said body member;
   clamping means for bringing said guide member and said body member together to fix the line therebetween;
   a pair of stops on said guide member, said body member movable between said stops with said lower stop and said body member providing the means for fixing the line extending therebetween, said clamping means including clamping elements on the lower side of said body member and on said lower stop, at least one of said clamping elements being magnetic whereby when the tension in the line is reduced as a result of the weighted free end reaching the waterbed and the float reaching the surface the line is held with the hook thereon at a predetermined location with respect to the waterbed and whereby when the tension in the line is increased as a result of a tractive force being applied to the other end thereof the line is released for adjusting the hook location.

2. A buoyant float device for attachment to a fishing line having a hook thereon positioned with respect to the weighted free end thereof, comprising:
   a guide member and a body member interconnected for relative movement therebetween, said guide member being a hollow oblong member and said body member moves within said guide member substantially along its longitudinal axis;
   means on the float for slidably attaching the float to the fishing line, said attaching means being positioned on the float so that the line extends between said guide member and said body member and when taut extends in a direction to separate said guide member and said body member; and
   clamping means cooperating with said guide member and said body member for bringing said guide member and said body member together to fix the line therebetween whereby when the tension in the line is reduced as a result of the weighted free end reaching the waterbed and the float reaching the surface the line is held with the hook thereon at a predetermined location with respect to the waterbed and whereby when the tension in the line is increased as a result of a tractive force being applied to the other end thereof the line is released for adjusting the hook location.

3. A buoyant float device for attachment to a fishing line having a hook thereon positioned with respect to the weighted free end thereof, comprising:
   a guide member and a body member interconnected for relative movement therebetween, said body member being positioned concentrically about said guide member for movement thereon, said body member being hollow and open at its underside and being provided with valve means at its upper end;

means on the float for slidably attaching the float to the fishing line, said attaching means being positioned on the float so that the line extends between said guide member and said body member and when taut extends in a direction to separate said guide member and saidy body member; and
   clamping means cooperating with said guide member and said body member for bringing said guide member and said body member together to fix the line therebetween whereby when the tension in the line is reduced as a result of the weighted free end reaching the waterbed and the float reaching the surface the line is held with the hook thereon at a predetermined location with respect to the waterbed and whereby when the tension in the line is increased as a result of a tractive force being applied to the other end thereof the line is released for adjusting the hook location.

4. The float device of claim 3, wherein said means attaching said line with the float exerts friction therebetween, said attaching means being operably joined with said guide member, said valve means being adapted to close at least temporarily in response to the frictional force exerted on said guide member when the weighted free end of the line moves toward the waterbed.

5. The float device of claim 4, wherein said means for attaching the float and line is adjustable to vary the friction between said line and float.

6. The float device of claim 3, wherein said guide member is provided with a pair of stops with said body member being movable therebetween, said upper stop cooperating with said valve means during the closing thereof.

7. The float device of claim 6, wherein said lower stop comprises a buoyant body.

8. The float device of claim 6, wherein at least one of said stops is adjustable.

9. The float device of claim 6, wherein the lower end of said body member and said lower stop are provided with cooperating clamping elements with at least one of said clamping elements being magnetic.

10. The float device of claim 3, wherein said valve means includes a hollow tube having a valve element on the upper end thereof and slidable lengthwise within the upper end of said body member.

* * * * *